Patented Mar. 9, 1954

2,671,811

UNITED STATES PATENT OFFICE 2,671,811

ANTIFOAM AGENTS COMPRISING CONDENSATION PRODUCT OF ETHYLENE OXIDE WITH 1,12-OCTADECANEDIOL

William Baird, Manchester, Kenneth Hall Jones, Northwich, and Arthur Macarthur, Manchester, England, assignors to Imperial Chemical Industries Limited, a corporation of Great Britain No Drawing. Application May 22, 1951, Serial No. 227,736

Claims priority, application Great Britain June 12, 1950

2 Claims. (Cl. 260—615)

This invention relates to new diethers of a diol with ethylene oxide suitable for overcoming the tendency to foam of aqueous media by addition thereto.

Ethers obtained from 15 moles of ethylene oxide and 1 mole of 1:12 octadecanediol are known for use in dyeing. Ethers and diethers of polyoxyalkylene glycols are known for use as antifoaming agents.

Very few of the agents which are adequate to prevent foaming at temperatures up to 100° C. are at all effective in preventing foaming at the temperatures reached in pressure boilers operating for example at or above a pressure of 200 lbs. a square inch. Even those which are effective at this pressure with some waters are not universally effective with all waters that are liable to foam during generation of steam, and this is particularly true for locomotive boilers because of the enormous variation in load and fluctuations in quality of the feedwater.

We have found that a substantially greater antifoaming effect is obtained in pressure boilers with a new ether obtained from 18 to 25 moles of ethylene oxide and 1 mole of 1:12 octadecane diol, than is obtained with the known agents. There was no reason to suspect that these derivatives of ethylene oxide with this diol would have a greater effect than those with alcohols or other diols. Moreover, an ether containing only 15 moles of ethylene oxide per mole of 1:12 octadecanediol is virtually useless in preventing foaming in a boiler at temperatures above 100° C. Likewise, an ether containing 30 moles of ethylene oxide per mole of 1:12 octadecanediol is virtually useless in preventing foaming in a boiler at temperatures above 100° C.

According to the present invention, therefore, we provide new diethers of straight chain 1:12 octadecanediol with from 18 to 25 moles of ethylene oxide per mole of diol. We manufacture these diethers, for example, by a process which comprises reacting straight chain 1:12 octadecanediol with from 18 to 25 moles of ethylene oxide per mole of diol, in presence of an alkaline catalyst. The temperature used is generally between 100° and 200° C., preferably about 140° C.; normal or elevated pressures may be used.

In making these diethers, we can use a variety of alkaline catalysts such as sodium, potassium and calcium; or the hydroxides or oxides thereof. The reaction is continued until the requisite amount of ethylene oxide has been absorbed.

As we have already stated, the new diethers are especially useful for treating aqueous media in order to prevent or minimise foaming during the generation of steam from such media. According to this feature of the invention, a process for minimising foaming of an aqueous medium which is liable to foam during the generation of steam therefrom which comprises adding to the aqueous medium a diether of straight chain 1:12 octadecanediol with from 18 to 25 moles of ethylene oxide, and thereafter heating it to generate steam. Our method of preventing or minimising foaming in a locomotive or other boiler generating steam from a boiler water having a tendency to foam on boiling which comprises dispersing into the said water a diether of straight chain 1:12 octadecanediol with from 18 to 25 moles of ethylene oxide in an effective amount up to 1 part per million of boiler water, and heating the resulting liquid to generate steam therefrom. It is normally necessary to use at least 0.1 part per million of diether, and 0.3 part per million generally produces sufficient antifoaming effect. For adding to boiler water, the diethers are preferably mixed with other water treatment chemicals to provide a suitable composition comprising a composition adapted to be dispersed into a boiler water having a tendency to foam on boiling, comprising a diether of straight chain 1:12 octadecane diol, a tannin, glassy sodium polyphosphate of $Na_2O/P_2O_5$ ratio 1.12, and sodium carbonate. Such a composition preferably contains from 0.5 to 3% of diether, from 30 to 60% of a tannin, 1 to 5% of glassy sodium polyphosphate of $Na_2O/P_2O_5$ ratio 1.12, and 30 to 60% of sodium carbonate.

The manufacture of the diethers of this invention is illustrated in Example 1, and their use as antifoaming agents is illustrated in Example 2, with other results for comparison.

Example 1

To an agitated mixture of 28.6 parts (by weight) of 1:12 octadecanediol and 0.1 part of sodium at 135°–140° C. are added slowly 88 parts of ethylene oxide. The material so obtained is a good antifoaming agent.

Example 2

The diether prepared in Example 1 was tested in a boiler generating steam at a constant rate at 200 lbs. per sq. in., using a continuous feed of a lime-soda softened water containing a total of 5000 parts per million of NaOH, $Na_2CO_3$ and $Na_2SO_4$. The antifoaming effect was measured by the increase of total solids content of the water after 2 hours' boiling. In the absence of any antifoaming agent, the foaming and priming were so great that the loss of boiler water in the steam prevented the total solids content rising above 25,000 p. p. m. Without any carryover, the total solids content would, at that stage, have been 52,000 p. p. m. When 0.16 p. p. m. of the above diether was mixed with the feed-water, it took much longer for boiler water to be lost in the steam, and the total solids content rose to 45,000 p. p. m.

For comparison, using the same amount of a diether obtained from 1:12 octadecanediol with only 15 moles of ethylene oxide, the total solids content only rose to 27,000 p. p. m. Similarly, using the same amount of a diether obtained from 1:12 octadecanediol with 30 moles of ethylene oxide, the total solids content only rose to 23,000 p. p. m. Using 0.3 p. p. m. of the ether obtained from 1 mole of cetyl alcohol with 7 moles of ethylene oxide, the total solids content only rose to 27,000 p. p. m.

What we claim is:

1. Diethers of straight chain 1:12-octadecanediol with from 18 to 25 moles of ethylene oxide per mole of diol.

2. Process for the manufacture of diethers which comprises reacting straight chain 1:12-octadecanediol with from 18 to 25 moles of ethylene oxide per mole of diol, in presence of an alkaline catalyst at a temperature between 100° and 200° C.

WILLIAM BAIRD.
KENNETH HALL JONES.
ARTHUR MACARTHUR.

References Cited in the file of this patent

UNITED STATES PATENTS

| Number | Name | Date |
|---|---|---|
| 2,133,480 | Schoeller | Oct. 18, 1938 |
| 2,174,761 | Schuette | Oct. 3, 1939 |
| 2,510,540 | Ballard | June 6, 1950 |
| 2,520,611 | Roberts | Aug. 29, 1950 |
| 2,522,155 | Ballard | Sept. 12, 1950 |
| 2,575,298 | Ryznar | Nov. 13, 1951 |